United States Patent
Braun

(10) Patent No.: US 6,200,037 B1
(45) Date of Patent: *Mar. 13, 2001

(54) LUBRICANT DISTRIBUTING VANES FOR UNITIZED WHEEL HUB AND BEARING ASSEMBLY

(75) Inventor: Barry E. Braun, Veradale, WA (US)

(73) Assignee: Stemco Inc, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/324,329

(22) Filed: Jun. 2, 1999

(51) Int. Cl.[7] ........................................ F16C 33/66
(52) U.S. Cl. ............................................ 384/466; 384/472
(58) Field of Search .................................... 384/465, 466, 384/471, 472, 474

(56) References Cited

U.S. PATENT DOCUMENTS

| | | |
|---|---|---|
| 822,046 | 5/1906 | Hobart . |
| 1,633,806 | 6/1927 | Crawford . |
| 1,685,517 | 9/1928 | Baldwin . |
| 2,080,744 | 5/1937 | Rogers . |
| 2,264,635 | 12/1941 | Graham et al. . |
| 3,425,760 | 2/1969 | Gordon . |
| 3,436,134 | 4/1969 | Gordon . |
| 3,913,992 | 10/1975 | Scott et al. . |
| 4,249,783 | 2/1981 | Glassmeyer . |
| 4,648,485 | 3/1987 | Kovaleski . |
| 5,328,275 | 7/1994 | Winn et al. . |
| 5,499,902 | 3/1996 | Rockwood . |
| 5,591,020 | 1/1997 | Rockwood . |
| 5,904,427 | * 5/1999 | Braun et al. ..................... 384/472 |

FOREIGN PATENT DOCUMENTS

| | | |
|---|---|---|
| 0 126 607 A2 | 11/1984 | (EP) . |
| WO 93/07013 | 4/1993 | (WO) . |

* cited by examiner

Primary Examiner—Lenard A. Footland
(74) Attorney, Agent, or Firm—Cummings & Lockwood

(57) ABSTRACT

A wheel hub and bearing assembly for mounting on a vehicle axle. The assembly includes a wheel hub having a longitudinal axis, a pair of bearings within the wheel hub, the bearings in spaced axial relation along the longitudinal axis of the wheel hub, a lubricant cavity within the wheel hub between the axially spaced bearings adapted to be filled with a lubricant prior to the wheel hub being mounted on an axle, and a vane disposed within the lubricant cavity and extending radially outwardly with respect to the longitudinal axis of the wheel hub. The vane includes first and second passages. The first passage has a transverse port for receiving lubricant into the vane upon rotation of the wheel hub on the axle, a radial passageway for directing lubricant flow from the transverse port in a radially inward direction towards the longitudinal axis of the wheel hub, and an axial nozzle for directing lubricant flow from the radial passageway in an axial direction, with respect to the longitudinal axis of the wheel hub, out of the vane and within the lubricant cavity towards one of the axially spaced bearings. The second passage has a transverse port for receiving lubricant into the vane upon opposite rotation of the wheel hub on the axle, a radial passageway for directing lubricant flow from the transverse port of the second passage in a radially inward direction towards the longitudinal axis of the wheel hub, and an axial nozzle for directing lubricant flow from the radial passageway of the second passage in an axial direction, with respect to the longitudinal axis of the wheel hub, out of the vane and within the lubricant cavity towards one of the axially spaced bearings.

13 Claims, 4 Drawing Sheets

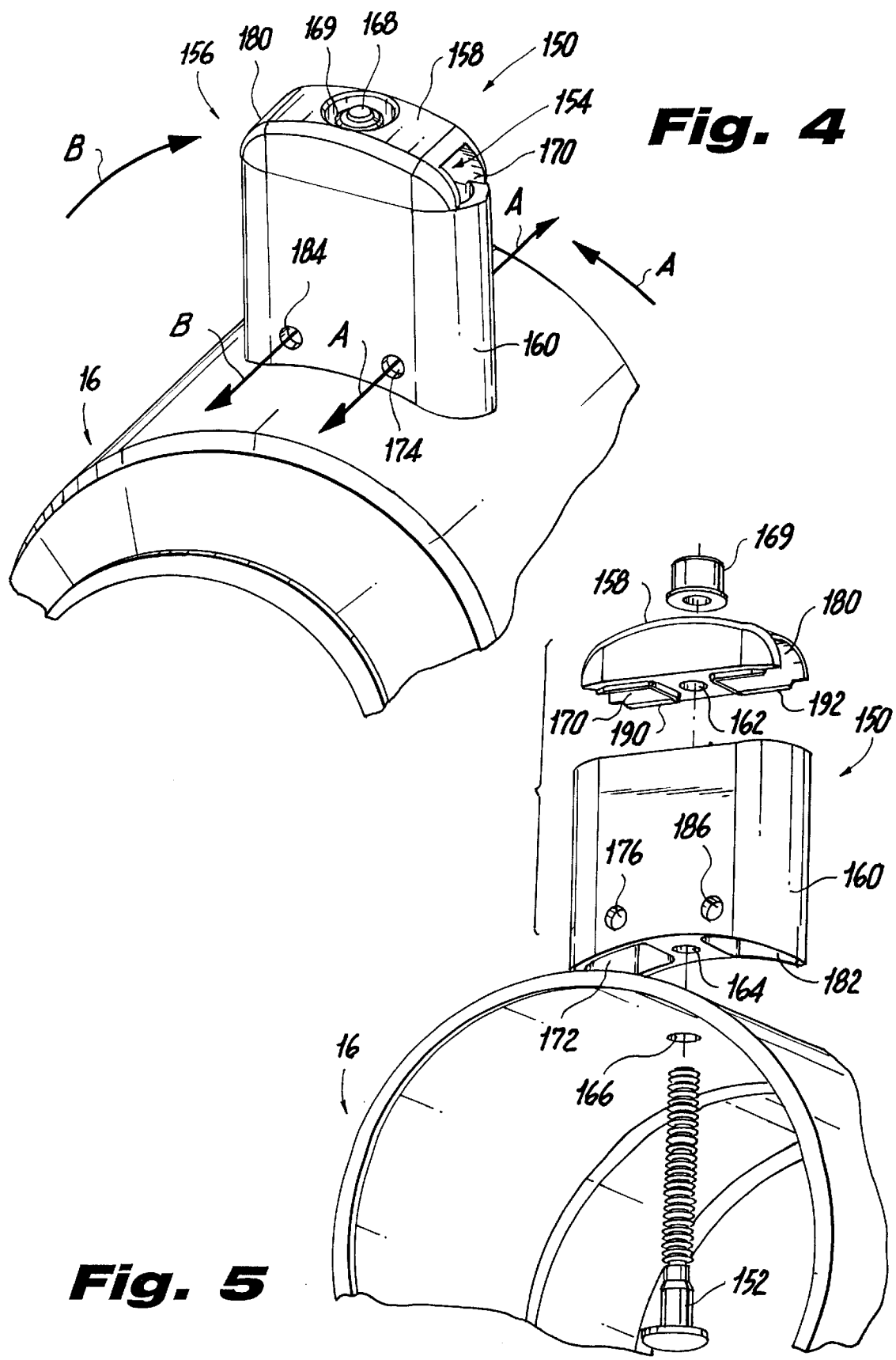

LUBRICANT DISTRIBUTING VANES FOR UNITIZED WHEEL HUB AND BEARING ASSEMBLY

BACKGROUND OF DISCLOSURE

This invention relates to improved lubricant distributing vanes for use as part of a unitized wheel hub and bearing assembly. The unitized wheel hub and bearing assembly is for being secured on the end of vehicle axle such that a wheel can be mounted on the assembly and rotate with respect to the axle. The improved vanes are provided in a lubricant cavity of the hub assembly to redirect lubricant distribution to axially-spaced bearings within the cavity to insure adequate lubrication and cooling of the bearings.

In wheeled vehicles of all types, it is necessary to provide bearings for axles so that associated wheel hubs may rotate freely on the end of a relatively stationary axle. Such bearings must be lubricated and seals are required to retain the lubricating medium whether it be grease or oil. Frequently, wear sleeves are employed to prevent undue wear of the axle by the seals. Sometimes, such wear sleeves have been separate elements and sometimes they have been an integral part of a unitized seal.

Until quite recently, such bearing, seal and wheel hub means have been assembled piece by piece. The bearing races have been fitted to designated axle portions and corresponding portions of the associated wheel hub. The bearing elements are usually spaced as far apart axially as possible with a tapered axle portion between these elements. The assembly also includes one or two seals, depending upon the particular design. These wheel hub assemblies have typically provided long lasting performance when assembled properly. However, such an assembly process requires skilled personnel and proper equipment to achieve proper installation and operation. If repair or replacement of any part becomes necessary, correct positioning and adjustment of all elements becomes even more of a challenge and damaged parts are a quite likely result.

A non-unitized wheel hub assembly requires the components to be assembled and installed on site by a mechanic working on an axle spindle. The nature of the assembling process, and the generally horizontal orientation of the spindle during assembly, makes it difficult to fill the assembly with a liquid such as oil and the non-unitized wheel hub assembly must be lubricated with packing grease or oil filled after installation. Therefore, there was a need for a unitized wheel hub assembly which allows the assembly to be pre-filled with oil to achieve superior lubrication characteristics in contrast to the non-unitized assemblies.

More recently, some efforts have been made to develop assemblies which permit more of the various elements to be pre-assembled and adjusted, thus resulting in less dependence on the skills of the field mechanic. One such attempt has been the SAF Euro-axle developed by the Otto Sauer Achsenfabric of Keilber, Germany. These units accomplish much in terms of allowing factory assembly and adjustments of sealed bearing units and avoidance of so much dependence on the skills of the field mechanic. However, these units are not constructed to allow prefilling with oil which is a preferred bearing lubricant as compared to grease. More significantly, a special axle is included in the assembly and the pre-assembled units cannot be adapted to the millions of existing axles presently in service.

Another recent effort at development of pre-assembled and pre-adjusted sealing bearing units has been made by SKF Sweden. However, as with SAF units described previously, the SKF units are not adapted to prefilling with oil lubrication and they are not adaptable to the millions of existing axles. Furthermore, since the bearing units are more closely located relative to one another, there can be a tendency toward lessened wheel stability in operation.

Another effort at development of pre-assembled and pre-adjusted sealing bearing units which are prefilled with oil lubrication is illustrated in U.S. Pat. No. 5,328,275 assigned to Stemco Inc., the assignee of the present disclosure. These units also provide the advantage of being adaptable to the millions of existing axles. In addition, they include lubricant distributing vanes for redirecting lubricant to the bearings. In U.S. Pat. No. 5,904,427, also assigned to Stemco, Inc., there is shown a unitized wheel hub and bearing assembly including lubricant distributing vanes for redirecting lubricant to bearings within the assembly.

The present disclosure is directed to improved lubricant directing vanes for use in a unitized wheel hub and bearing assembly.

SUMMARY OF DISCLOSURE

Accordingly, the present disclosure provides a wheel hub and bearing assembly for mounting on a vehicle axle. The assembly includes a wheel hub having a longitudinal axis, a pair of bearings within the wheel hub, the bearings in spaced axial relation along the longitudinal axis of the wheel hub, a lubricant cavity within the wheel hub between the axially spaced bearings adapted to be filled with a lubricant prior to the wheel hub being mounted on an axle, and a vane disposed within the lubricant cavity and extending radially outwardly with respect to the longitudinal axis of the wheel hub.

The vane includes first and second passages. The first passage has a transverse port for receiving lubricant into the vane upon rotation of the wheel hub on the axle, a radial passageway for directing lubricant flow from the transverse port in a radially inward direction towards the longitudinal axis of the wheel hub, and an axial nozzle for directing lubricant flow from the radial passageway in an axial direction, with respect to the longitudinal axis of the wheel hub, out of the vane and within the lubricant cavity towards one of the axially spaced bearings. The second passage has a transverse port for receiving lubricant into the vane upon opposite rotation of the wheel hub on the axle, a radial passageway for directing lubricant flow from the transverse port of the second passage in a radially inward direction towards the longitudinal axis of the wheel hub, and an axial nozzle for directing lubricant flow from the radial passageway of the second passage in an axial direction, with respect to the longitudinal axis of the wheel hub, out of the vane and within the lubricant cavity towards one of the axially spaced bearings.

BRIEF DESCRIPTION OF THE DRAWINGS

Further objects and advantages of the present invention will become more apparent from the following description and claims and from the accompanying drawings, wherein:

FIG. 4 is a view similar to FIG. 2, but illustrating another oil distribution vane according to the present disclosure;

FIG. 5 is a rear, exploded, isometric view of the vane of FIG. 4;

DETAILED DESCRIPTION

Figure 1:
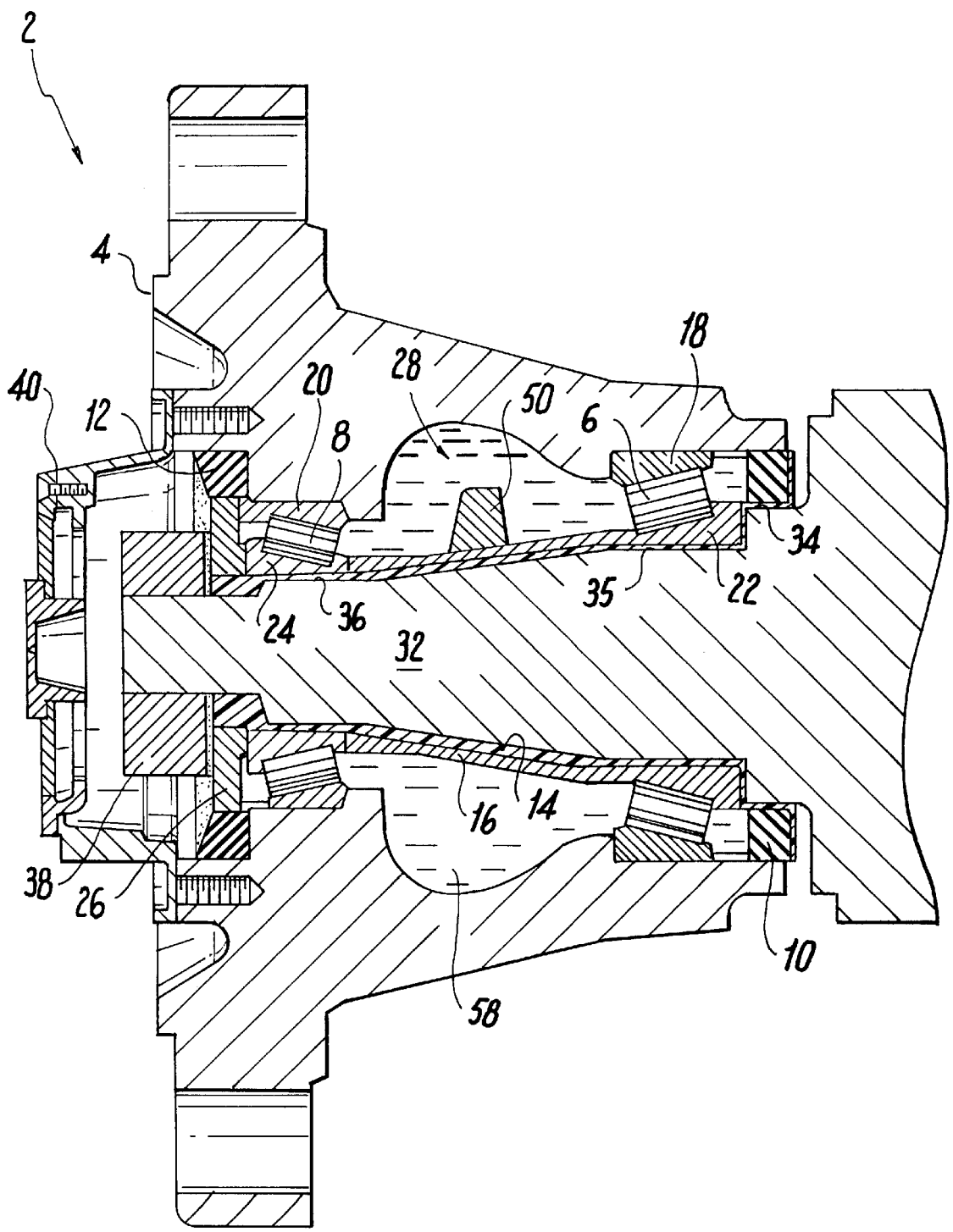
FIG. 1 is a cross-sectional view of the unitized wheel hub and bearing assembly having an oil distribution vane in accordance with the present invention.

Referring now to the drawings in detail wherein like numerals indicate like elements throughout the several views, FIG. 1 shows a unitized wheel hub and bearing assembly 2. Such an assembly is shown in U.S. Pat. No. 5,904,427, which is assigned to Stemco, Inc., the assignee of the present disclosure. U.S. Pat. No. 5,904,427 is incorporated herein by reference in its entirety.

The assembly 2 includes a wheel hub 4, axially inner and outer bearings 6 and 8, axially inner and outer seals 10 and 12 and a mounting sleeve 14. Radially outer bearings races 18 and 20 of inner and outer bearings 6 and 8, respectively, are pressed into bores within wheel hub 4 and radially inner bearing races 22 and 24 are fitted into the primarily radially outer cylindrical surface of mounting sleeve 14. A bearing spacer 16 is further positioned onto the outer surface of mounting sleeve 14 between the inner bearing races 22, 24 of bearings 6 and 8, respectively, wherein the bearing spacer 16 positions the inner bearing races 22 and 24 in precise axial relationship to each other, along with their respective outer races 18, 20. Inner seal 10 is mounted between wheel hub 4 and mounting sleeve 14. A lock nut 26 is positioned on a threaded portion of mounting sleeve 14 and assures that the bearings maintain their proper position by applying axial compressive force to inner race 24, and through bearing spacer 16, onto inner race 22. Outer seal 12 is mounted between wheel hub 4 and an outer cylindrical surface of lock nut 26.

Wheel hub 4, inner seal 10, mounting sleeve 14, lock nut 26 and outer seal 12 cooperate to form a sealed cavity 28 which contains bearings 6 and 8 and which is filled with bearing lubricant. The lubricant may be grease or oil, but in most instances, oil is preferred. One or more vanes 50 are positioned on bearing spacer 16. The vane 50 serves to direct flow of the lubricant to the bearings as described hereinafter, thus helping to insure that lubrication and cooling of the bearings is maintained at all times.

Rather than position vane 50 on bearing spacer 16, it could be physically attached to mounting sleeve 14 or even axle end 32 in the absence of a spacer or mounting sleeve, which may be the case in some applications, as discussed above. Alternatively, the vane could fit through an opening in the spacer 16.

In practice, all of the members described thus far are preferably assembled to form the unitized wheel hub and bearing assembly 2 ready for installation on an axle end as shown at 32. In order that assembly may be solidly mounted on axle end 32, the mounting sleeve 14 is made with inner cylindrical surfaces dimensioned so as to locate upon portions of axle end 32. In the embodiment shown, those surfaces are at 34, 35 and 36. The entire assembly is positioned on axle end 32 and held in axially proper position by spindle nut 38. Since bearing adjustment is accomplished by clamping and positively locking lock nut 26 at the time of assembly, no adjusting is required in the field to assure proper operation. Dust cap 40 is mounted on the end of the wheel hub to protect the axially outer portions of assembly from road debris, dust, rain and any other potential contaminants. The cavity of hub 4 may be pre-filled with a lubricant at any time prior to installation on axle end 32.

Figure 2:
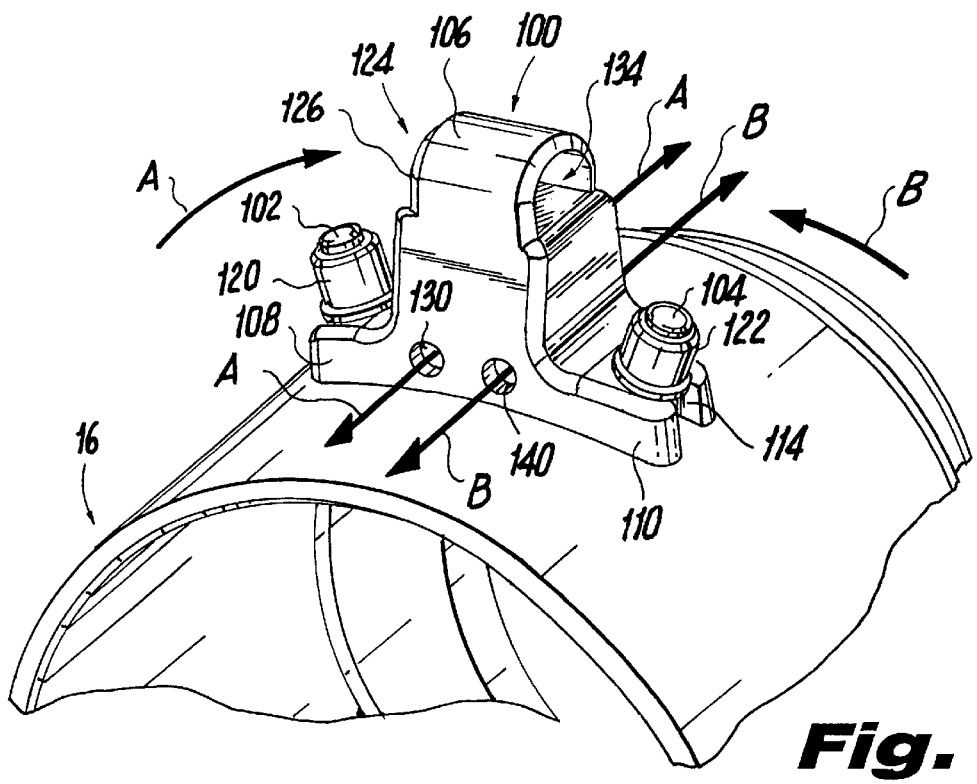
FIG. 2 is a rear isometric view of the oil distribution vane and a bearing spacer of the unitized wheel hub and bearing assembly of FIG. 1.
Figure 3:
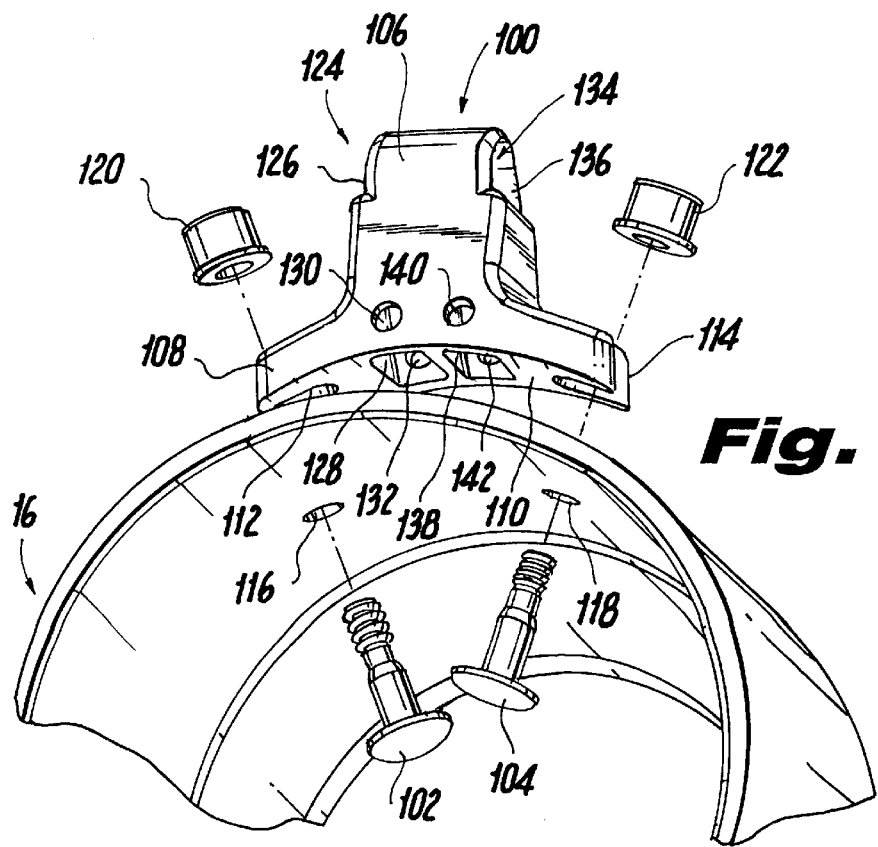
FIG. 3 is a rear, exploded, isometric view of the vane and the bearing spacer of FIG. 2.

FIGS. 2 and 3 show an oil distribution vane 100, according to the present disclosure, mounted on the bearing spacer 16 with two fasteners 102, 104. In the absence of the bearing spacer 16, the vane 100 can be mounted directly on the axle 32 or the mounting sleeve 14.

The vane 100 includes a main body 106 and attachment legs 108, 110 extending from opposite sides of the main body. Each attachment leg 108, 110 includes an opening 112, 114 for receiving one of the two fasteners 102, 104 therethrough for securing the vane 100 to the spacer 16. As shown, the openings 112, 114 of the attachment legs 108, 110 preferably comprise slots. It has been found that the slots 112, 114, as opposed to circular opening for example, ease assembly of the vane to the spacer.

The fasteners preferably comprise pins 102, 104 that extend through holes 116, 118 in the spacer 16, through the openings 112, 114 in the attachment legs 108, 110, and are secured with collars 120, 122. Even more preferably, the fasteners comprise lockbolt fastener systems, wherein the pins 102, 104 are grooved and are placed through the holes 116, 118 in the spacer 16 and the openings 112, 114 in the attachment legs 108, 110. The collars 120, 122 are then placed on the pins 102, 104, and an installation tool is used to swag the collars into the grooves of the pins, and a portion of each pin extending beyond the collars is broken off, generally flush with the pins. A preferred lockbolt system is a Magna-Grip® lockbolt fastener available from Cordant Technologies, Huck Industrial Fastener Division of Waco, Tex., which also provides the hydraulic installation tools. It has been found that the lockbolt fasteners are easier to install, provide greater retention strength and are less susceptible to loosening do to vibration than other types of fasteners, such as a nut and bolt combination.

The main body 106 includes opposing first and second oil distribution passages 124, 134 for accepting oil regardless of the direction of rotation of the hub assembly 2. The first passage 124 includes a transverse port 126, for receiving lubricant flow A upon counter-clockwise rotation of the hub assembly 2 (assuming a counter-clockwise direction of rotation for the hub assembly 2 as viewed from the left hand end of FIG. 1). A radial passageway 128 directs the lubricant flow A from the transverse port 126 in a radially inward direction, and two opposing axial nozzles 130, 132 direct the lubricant flow A from the radial passageway in opposing axial directions (all with respect to the longitudinal axis of the wheel hub), towards both of the axially spaced bearings. The second passage 134 includes a transverse port 136, for receiving lubricant flow B upon clockwise rotation of the hub assembly 2, a radial passageway 138 for directing the lubricant flow B from the transverse port in a radially inward direction, and two opposing axial nozzles 140, 142 for directing the lubricant flow B from the radial passageway in opposing axial directions, towards both of the axially spaced bearings.

Thus, oil flow to the bearings 6, 8 is accomplished regardless of the rotational direction of the wheels and can be accomplished with the single vane 100. As shown, the transverse ports, or entrances, 126, 136 of the lubricant directing passages 124, 134 have a larger cross-sectional area than a cross-sectional area of the axial nozzles, or exits, 130, 132, 140, 142 of the passages, whereby the velocity of the lubricant flows A and B increase between the entrances and the exits of the passages.

Referring to FIGS. 4 and 5, an additional vane 150 according to the present invention is shown secured to the spacer 16 with a single fastener 152. The vane 150 includes opposing first and second oil distribution passages 154, 156 for accepting oil regardless of the direction of rotation of the hub assembly 2.

The vane 150 is made up of two separate parts: a cap 158 and a base 160, each having a centrally located fastener opening 162, 164 for alignment with a hole 166 in the spacer 16, and for receiving the fastener 152 for securing the vane to the spacer. The fastener preferably comprises a lockbolt fastening system including a grooved pin 152 that extends through the hole 166 in the spacer 16, through the openings 162, 164 in the vane 150, and is secured with a collar 169. A preferred lockbolt system is a Magna-Grip® lockbolt fastener as described above.

The first oil distribution passage 154 includes a transverse port 170 in the cap 158, for receiving lubricant flow A upon counter-clockwise rotation of the hub assembly 2 on the vehicle axle, a radial passageway 172 in the base 160 for directing lubricant flow from the transverse port in a radially inward direction, and two opposing axial nozzles 174, 176 in the base for directing lubricant flow from the radial passageway in opposing axial directions, towards both of the axially spaced bearings 6, 8. The second oil distribution passage 156 includes a transverse port 180 in the cap 158, for receiving lubricant flow B upon clockwise rotation of the hub assembly 2 on the vehicle axle, a radial passageway 182 in the base 160 for directing lubricant flow from the transverse port in a radially inward direction, and two opposing axial nozzles 184, 186 in the base for directing lubricant flow from the radial passageway in opposing axial directions, towards both of the axially spaced bearings 6, 8. As shown, the transverse ports, or entrances, 170, 180 have a larger cross-sectional area than a cross-sectional area of the axial nozzles, or exits, 174, 176 and 184, 186.

The cap 158 includes a bottom surface having lips 190, 192 extending therefrom around the transverse ports 170, 180. The lips 190, 192 are received in the radial passageways 172, 182 of the base 160 to correctly align the cap with the base.

Figure 6:
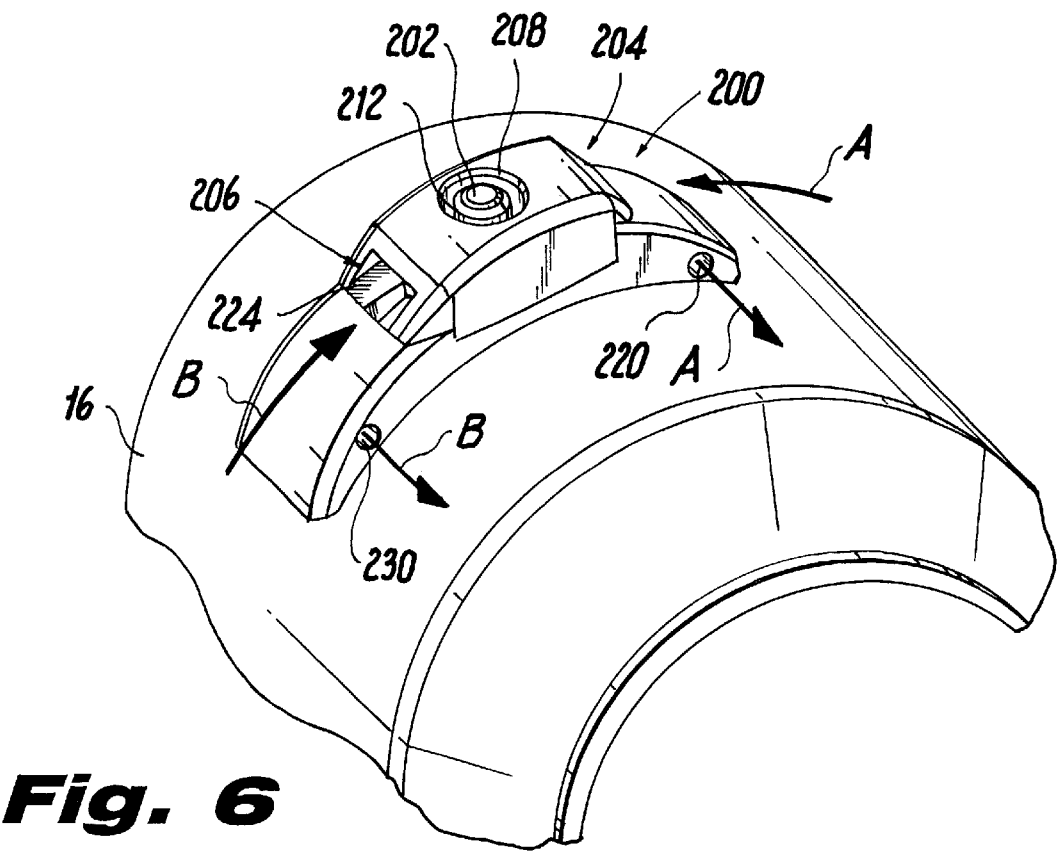
FIG. 6 is a view similar to FIG. 2, but illustrating an additional oil distribution vane according to the present disclosure.
Figure 7:
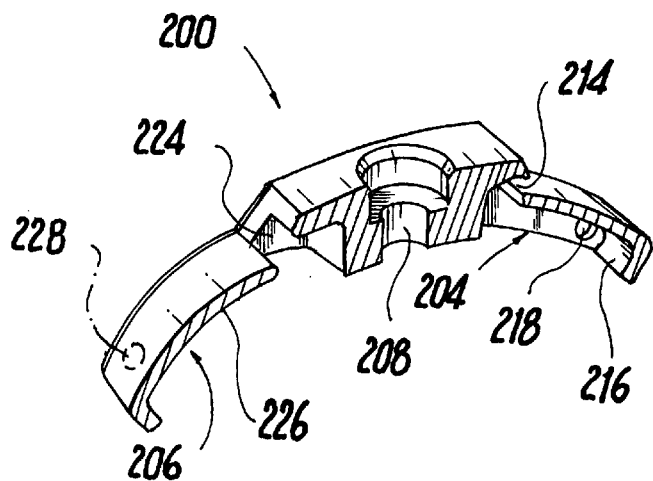
FIG. 7 is a cut-away view of the vane of FIG. 6.

Referring to FIGS. 6 and 7, an additional vane 200 according to the present invention is shown secured to the spacer 16 with a single fastener 202. The vane 200 includes opposing first and second oil distribution passages 204, 206 for accepting oil regardless of the direction of rotation.

The vane 200 has a centrally located fastener opening 208 for alignment with a hole 210 in the spacer 16, and for receiving the fastener 202. The fastener preferably comprises a lockbolt fastening system including a grooved pin 202 that extends through the hole 210 in the spacer 16, through the opening 208 in the vane 200, and is secured with a collar 212. A preferred lockbolt system is a Magna-Grip® lockbolt fastener as described above.

The first oil distribution passage 204 includes a transverse port 214 for receiving lubricant flow A upon counter-clockwise rotation of the hub assembly 2 on the vehicle axle, a passageway 216 for directing lubricant flow from the transverse port, and two opposing axial nozzles 218, 220 for directing lubricant flow from the passageway in opposing axial directions, towards both of the axially spaced bearings 6, 8. The second oil distribution passage 206 includes a transverse port 224, for receiving lubricant flow B upon clockwise rotation of the hub assembly 2, a passageway 226 for directing lubricant flow from the transverse port, and two opposing axial nozzles 228, 230 for directing lubricant flow from the passageway in opposing axial directions, towards both of the axially spaced bearings 6, 8. As shown, for each lubricant directing passage 204, 206, the transverse ports, or entrances, 214, 224 have a larger cross-sectional area than a cross-sectional area of the axial nozzles, or exits, 218, 220, 228, 230 of the passage.

The oil distribution vane 200 of FIGS. 6 and 7 is provided with a low profile. Thus, the passageways 216, 218 direct lubricant flow both radially inwardly and circumferentially outwardly with respect to the axle. This "low profile" vane 200 is for use in a hub assembly having a relatively small lubricant cavity. As shown, the axial nozzles 218, 220 of the first passage 204 are spaced from the axial nozzles 228, 230 of the second passage 206 more than the traverse port 214 of the first passage is spaced from the traverse port 224 of the second passage. In addition, a radial height of the vane is less than a circumferential width of the vane.

The principles, preferred embodiments and modes of operation of the presently disclosed oil distribution vanes have been described in the foregoing specification. The presently disclosed oil distribution vanes, however, are not to be construed as limited to the particular embodiments shown as these embodiments are regarded as illustrious rather than restrictive. Moreover, variations and changes may be made by those skilled in the art without departing from the spirit of the presently disclosed oil distribution vanes as set forth by the following claims.

What is claimed is:

1. A wheel hub and bearing assembly mountable on a vehicle axle comprising:

a) a wheel hub having a longitudinal axis;

b) a pair of bearings within said wheel hub, said bearings in spaced axial relation along the longitudinal axis of said wheel hub;

c) a lubricant cavity within said wheel hub between said axially spaced bearings;

d) a vane disposed within said lubricant cavity and extending radially outwardly with respect to the longitudinal axis of said wheel hub, the vane having a cap portion and a base portion, the vane including:

i) a first passage including,
   a transverse port in the cap portion for receiving lubricant into the vane upon rotation of said wheel hub on said axle,
   a radial passageway in the base portion for directing lubricant flow from said transverse port in a radially inward direction towards the longitudinal axis of said wheel hub, and
   an axial nozzle in the base portion for directing lubricant flow from said radial passageway in an axial direction, with respect to the longitudinal axis of said wheel hub, out of the vane and within said lubricant cavity towards one of said axially spaced bearings, and ii) a second passage including,
   a transverse port in the cap portion for receiving lubricant into the vane upon opposite rotation of said wheel hub on said axle,
   a radial passageway in the base portion for directing lubricant flow from said transverse port of said second passage in a radially inward direction towards the longitudinal axis of said wheel hub, and
   an axial nozzle in the base portion for directing lubricant flow from said radial passageway of said second passage in an axial direction, with respect to the longitudinal axis of said wheel hub, out of said vane and within said lubricant cavity towards one of said axially spaced bearings.

2. The assembly of claim 1 wherein said passages of said vane each further include an opposing axial nozzle in the base portion for directing lubricant flow from said radial passageway in an axial direction, with respect to the longitudinal axis of said wheel hub, out of said vane and within said lubricant cavity towards the other of said axially spaced bearings.

3. The assembly of claim 1 wherein the axial nozzles of said vane have a smaller cross-sectional area than the transverse ports.

4. The assembly of claim 1 further including a spacer positioned between said bearings, said vane mounted on said spacer.

5. The assembly of claim 4 wherein said vane is secured on said spacer by a fastener extending through said spacer and said vane.

6. The assembly of claim 5 wherein
the fastener extends through the cap portion, the base portion and the spacer.

7. The assembly of claim 5 wherein said fastener comprises a lockbolt fastening system including a grooved pin extending through the spacer and the vane, and secured with a collar swagged on the grooved pin.

8. The assembly of claim 1 wherein the axial nozzle of the first passage is spaced from the axial nozzle of the second passage more than the traverse port of the first passage is spaced from the traverse port of the second passage.

9. The assembly of claim 1 wherein a radial height of the vane is less than a circumferential width of the vane.

10. The assembly of claim 1 wherein the cap includes a bottom surface having lips extending therefrom and received in the radial passageways of the base.

11. An oil distribution vane for mounting between axially spaced bearings within a lubricant cavity of a wheel hub coaxially secured on an axle, the vane configured to extend radially outwardly with respect to the axle, the vane including:

a) a cap having,
opposing first and second transverse ports for receiving lubricant upon rotation of said wheel hub on said axle, and
a fastener opening extending through said cap;

b) a base supporting the cap and having,
first and second radial passageways for directing lubricant flow, respectively, from said first and said second transverse ports of said cap in a radially inward direction towards said axle,
a first axial nozzle for directing lubricant flow from said first radial passageway in an axial direction, with respect to the axle, towards one of said bearings,
a second axial nozzle for directing lubricant flow from said second radial passageway in an axial direction, with respect to the axle, towards one of said bearings, and
a fastener opening extending through said base in alignment with said fastener opening of said cap.

12. The oil distribution vane of claim 11 wherein the base further includes:

a third axial nozzle opposite the first axial nozzle for directing lubricant flow from said first radial passageway in an axial direction, with respect to the longitudinal axis of said wheel hub, out of said vane and within said lubricant cavity towards the other of said axially spaced bearings; and a fourth axial nozzle opposite the second axial nozzle for directing lubricant flow from said second radial passageway in an axial direction, with respect to the longitudinal axis of said wheel hub, out of said vane and within said lubricant cavity towards the other of said axially spaced bearings.

13. The oil distribution vane of claim 11 wherein the axial nozzles have a smaller cross-sectional area than the transverse ports.

* * * * *